United States Patent
Tallier et al.

(10) Patent No.: US 8,113,212 B2
(45) Date of Patent: Feb. 14, 2012

(54) SEPARATOR

(75) Inventors: Bernard Tallier, Cortaillod (CH);
Jean-Pierre Corlier, Chezard-St. Martin (CH); Joshua Rossouw, Kent (GB)

(73) Assignee: Philip Morris USA Inc., Richmond, VA (US)

( * ) Notice: Subject to any disclaimer, the term of this patent is extended or adjusted under 35 U.S.C. 154(b) by 992 days.

(21) Appl. No.: 11/659,216

(22) PCT Filed: Aug. 3, 2005

(86) PCT No.: PCT/IB2005/002462
§ 371 (c)(1),
(2), (4) Date: Jun. 22, 2007

(87) PCT Pub. No.: WO2006/016264
PCT Pub. Date: Feb. 16, 2006

(65) Prior Publication Data
US 2008/0216849 A1    Sep. 11, 2008

(30) Foreign Application Priority Data
Aug. 3, 2004    (EP) .................................... 04254656

(51) Int. Cl.
*A24C 5/39*    (2006.01)
(52) U.S. Cl. ..................................... 131/110; 131/109.2
(58) Field of Classification Search .................. 131/109, 131/110
See application file for complete search history.

(56) References Cited

U.S. PATENT DOCUMENTS

| | | | |
|---|---|---|---|
| 1,979,624 A | 11/1934 | Klux | |
| 3,580,453 A * | 5/1971 | Schoeneman | 226/195 |
| 3,603,001 A | 9/1971 | Arnold et al. | |
| 4,155,486 A | 5/1979 | Brown | |
| 4,259,032 A | 3/1981 | Kuhner | |
| 4,534,368 A * | 8/1985 | Labbe | 131/110 |
| 4,587,979 A * | 5/1986 | Hagemann et al. | 131/110 |
| 5,538,383 A | 7/1996 | Ikeda et al. | |
| 5,806,531 A * | 9/1998 | Diehl et al. | 131/110 |
| 6,807,959 B1 * | 10/2004 | Murdock et al. | 124/61 |

FOREIGN PATENT DOCUMENTS

| | | | |
|---|---|---|---|
| DE | 20 04 666 | | 8/1971 |
| DE | 102 09 710 | | 9/2003 |
| DE | 203 16 310 | | 5/2004 |
| EP | 0 501 910 | | 9/1992 |
| GB | 335 259 | | 9/1930 |
| GB | 335259 | * | 9/1930 |

* cited by examiner

Primary Examiner — Philip Tucker
Assistant Examiner — Vicki Wu
(74) Attorney, Agent, or Firm — Buchanan Ingersoll & Rooney PC

(57) ABSTRACT

A separator for pneumatically transported particulate material comprises a separation surface through which, in use, a vacuum is drawn, for separating the particulate material from a gaseous medium in which it is transported and an inlet (30) for feeding a stream of the pneumatically transported io particulate material to the separation surface. The inlet (30) is moveable to sweep the particulate material over the separation surface, which may be a cylindrical sieve drum (2) mounted for rotation about its longitudinal axis. A rotary airlock (18) for pneumatically transported particulate material is comprises a plurality of radial vanes (32) mounted for rotation about a central axis. Each vane (32) is resiliently biased in a first radial position whereby, in use, when a force acts upon it in a direction contrary to the direction of rotation of the airlock (18), the vane (32) is deflected from the first radial position in the direction of the force and when the force is removed the vane (32) returns to the first radial position.

16 Claims, 5 Drawing Sheets

SEPARATOR

This application is a national stage application under 35 USC §371 of International Application Number PCT/IB2005/002462, filed Aug. 3, 2005, the international Application being published in English. This application also claims priority under 35 USC §119 to European Application No. 04254656.4, filed Aug. 3, 2004.

The present invention relates to a separator for pneumatically transported particulate material and finds particular application in the manufacture of cigarettes.

During cigarette manufacture, cut tobacco filler is typically pneumatically transported from a storage feeder into the tobacco rod maker. Before the cut filler is fed into the hopper that supplies the rod maker, the shreds of tobacco must be separated from the air used to pneumatically transport it. Removal of the conveying air is typically accomplished using a tangential separator including a cylindrical sieve drum having an air permeable surface to which suction is applied, and a rotary airlock for feeding the separated tobacco into the hopper.

In use, a stream of the pneumatically conveyed cut filler is fed from a substantially horizontal duct into the tangential separator through a fixed inlet located above the sieve drum, so that the stream passes tangentially over the cylindrical surface of the drum. Suction is applied laterally through ducts connected to either end of the sieve drum while it is rotated about its longitudinal axis, and the air is exhausted through the ducts as the stream of cut filler passes over the drum. The separated tobacco falls under gravity into the rotary airlock of the separator, which is mounted beneath the sieve drum, through which it is fed into the hopper.

The speed of the pneumatically transported tobacco, the internal shape and volume of the tangential separator and the strength of suction applied to the sieve drum are such that the tobacco due to its inertia is projected against, and follows a path along, the outer wall of the separator distant from the fixed inlet and does not come into contact with the surface of the sieve drum.

Despite the application of suction to the entire surface of the sieve drum, the inertia of the cut tobacco tends to result in the stream of tobacco being mainly concentrated around the centre line of the separator, in line with the fixed inlet. The relationship between the sieve drum, the rotary airlock and the hopper is such that uneven distribution of the separated tobacco which has passed over the sieve drum across the tangential separator gives rise to uneven distribution of tobacco across the rotary airlock, resulting in uneven delivery of tobacco to the hopper and hence the tobacco rod maker. Uneven tobacco distribution across the tangential separator is, therefore, undesirable because it can ultimately result in the formation of tobacco rods of irregular density and also because it may cause damage to the cut filler.

Known tangential separators for cigarette making machines also suffer from the disadvantage that excessive accumulation of tobacco in the rotary airlock can lead to blockages, resulting in damage to the tobacco fibres and reduced air-tightness of the airlock. The rotary airlock is mounted within a cylindrical housing at the base of the separator and comprises a plurality of radial vanes axially mounted on a rotatable central shaft. The cut filler that has passed over the sieve drum collects in chambers formed between neighbouring vanes of the rotary airlock.

In known tangential separators, each vane of the rotary airlock typically consists of a radially inward fixed metal plate on which a radially outward peripheral plastic seal is mounted. As the airlock rotates, the outer edge of the peripheral plastic seal of the vane is swept along the internal surface of the cylindrical housing creating a seal. In use, accumulation of excess tobacco and/or lumps of tobacco between the outer edge of the peripheral plastic seal of the vane and the cylindrical housing in which the airlock is mounted causes the seal to become permanently deformed, leading to increased gaps between the outer edge of the seal and the cylindrical housing and hence reduced air-tightness of the airlock.

According to a first aspect of the present invention there is provided a separator for pneumatically transported particulate material comprising: a separation surface through which, in use, a vacuum is drawn, for separating the particulate material from a gaseous medium in which it is transported; and an inlet for feeding a stream of the pneumatically transported particulate material to the separation surface, characterised in that the inlet is moveable to sweep the particulate material over the separation surface.

Preferably, the inlet is moveable to sweep the particulate material substantially evenly over the separation surface.

Preferably, the separation surface is a cylindrical sieve drum mounted for rotation about its longitudinal axis.

Preferably, the inlet is moveable to sweep the particulate material over the circumferential surface of the sieve drum.

By sweeping the stream of pneumatically transported material over the separation surface, the present invention enables an improved distribution of the particulate material across the separator to be obtained.

According to a second aspect of the present invention there is provided a rotary airlock for pneumatically transported particulate material such as tobacco comprising a plurality of radial vanes mounted for rotation about a central axis, characterised in that each of the vanes is resiliently biased in a first radial position whereby, when a force acts upon the vane in a direction contrary to the direction of rotation of the airlock, the vane is deflected from the first radial position in the direction of the force and when the force is removed the vane returns to the first radial position.

Through the inclusion of vanes which can be temporarily deflected when they encounter lumps of tobacco or excessive accumulation of tobacco, the rotary airlock of the second aspect of the present invention enables improved air-tightness of the airlock to be maintained and reduced damage to tobacco fibres to be achieved compared to known rotary airlocks.

Preferably, the deflection of the vane is proportional to the magnitude of the force acting upon it. By allowing each vane to deflect by an amount proportional to the magnitude of the force acting upon it, the rotary airlock of the present invention also enables improved air-tightness to be achieved where the housing in which the rotary airlock is mounted is not of perfectly circular cross section.

The invention will be further described by way of example with reference to the accompanying drawings in which:

FIG. 4b shows a schematic front view of the tangential separator of FIG. 4a;

Figure 1:
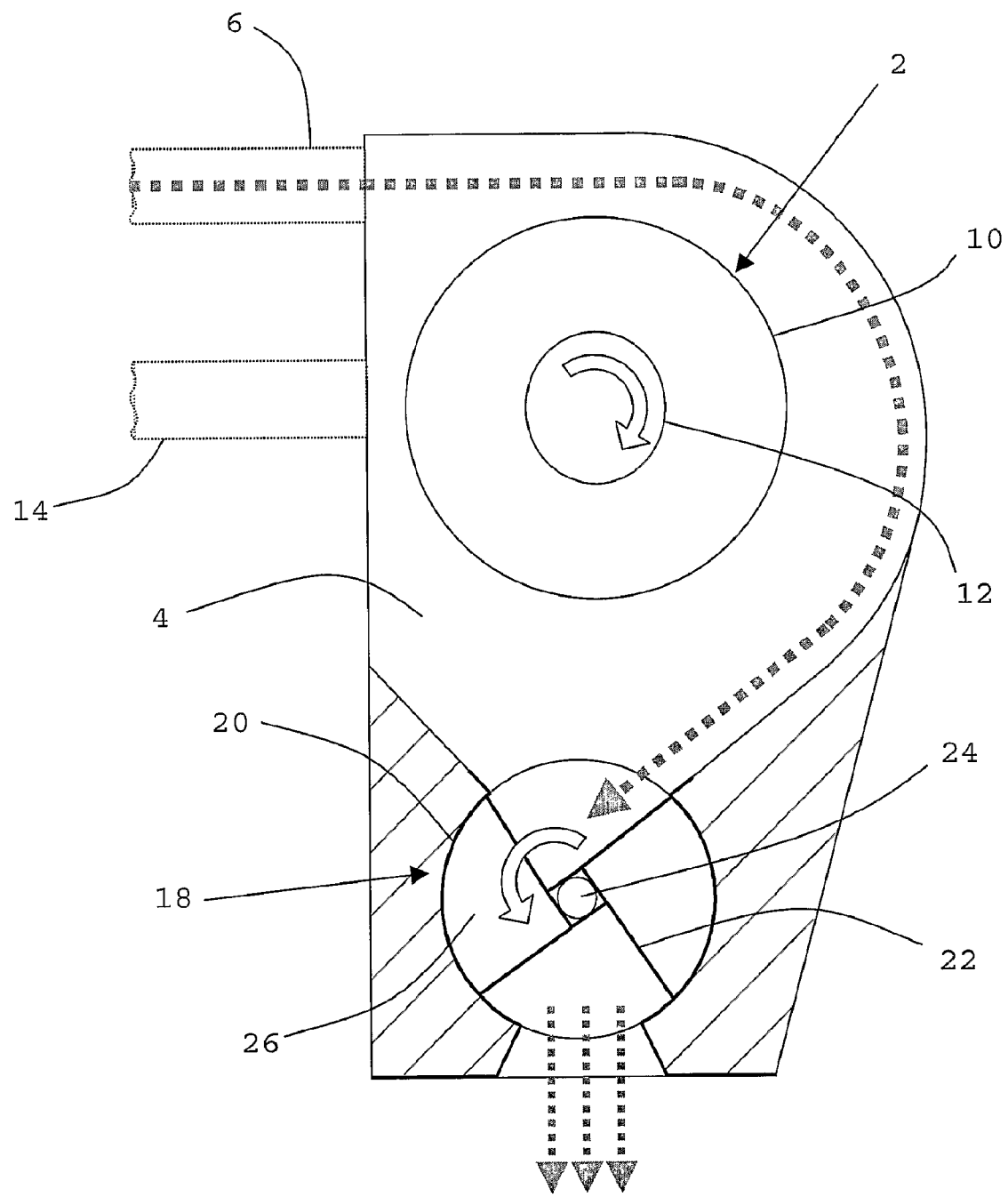
FIG. 1 shows a schematic partial vertical cross-section of a known tangential separator for pneumatically transported tobacco.

The known tangential separator shown in FIG. 1 comprises a cylindrical sieve drum 2 mounted, for rotation about its longitudinal axis, in the upper portion of a chamber 4. A substantially horizontal duct 6 for feeding pneumatically transported tobacco from a storage feeder (not shown) into the tangential separator is connected to the chamber 4 by a fixed inlet 8 mounted above the sieve drum 2 in the side of the chamber 4.

The sieve drum 2 comprises a pair of concentric hollow cylinders of circular cross-section, an outer cylinder 10 formed from a fine wire netting or mesh and an inner cylinder 12, coupled to the outer cylinder 10, having a plurality of holes disposed around its circumferential surface. An exhaust duct 14, mounted below the inlet 6 in the side of the chamber 4, is connected to the hollow interior of the inner cylinder 12 by a pair of ducts 16 connected to either end thereof.

A rotary airlock 18 is mounted beneath the sieve drum 2 in a cylindrical housing 20 at the base of chamber 4. The rotary airlock 18 comprises four radial vanes 22 mounted at 90° intervals around a rotatable central shaft 24 having a longitudinal axis parallel to that of the sieve drum 2. Four chambers 26, bounded by the opposed surfaces of two adjacent vanes 22 and a portion of the central shaft 24 of the rotary airlock 18, are arranged between the pairs of adjacent vanes 22. Each of the four vanes 22 comprises an inner metal plate fixedly mounted on the central shaft 24 and an outer peripheral plastic seal 28 mounted on the metal plate.

In use, a stream of pneumatically transported tobacco (indicated by the dotted arrow in FIG. 1) having a speed of between about 15 ms$^{-1}$ and about 25 ms$^{-1}$ is fed from the duct 6 into the tangential separator through the fixed inlet 10. As the inlet 8 opens out into the chamber 4, the speed of the conveying air decreases and the tobacco due to its inertia is projected over the sieve drum 2, as it is rotated about its longitudinal axis in the direction indicated by the arrow in FIG. 1, and against the outer wall of the chamber 4 distant from the inlet 8.

A vacuum is drawn through the circumferential surface of the outer cylinder 10 and inner cylinder 12 of the sieve drum 2, by way of the ducts 16, using a suction turbine (not shown) connected to the exhaust duct 14. As the stream of cut filler passes over the sieve drum 2, the air used to transport the tobacco is drawn by the suction turbine through the fine wire netting or mesh forming the circumferential surface of the outer cylinder 10 and the holes in the circumferential surface of the inner cylinder 12 and exhausted from the tangential separator through the ducts 16 and the exhaust duct 14.

Figure 2A:
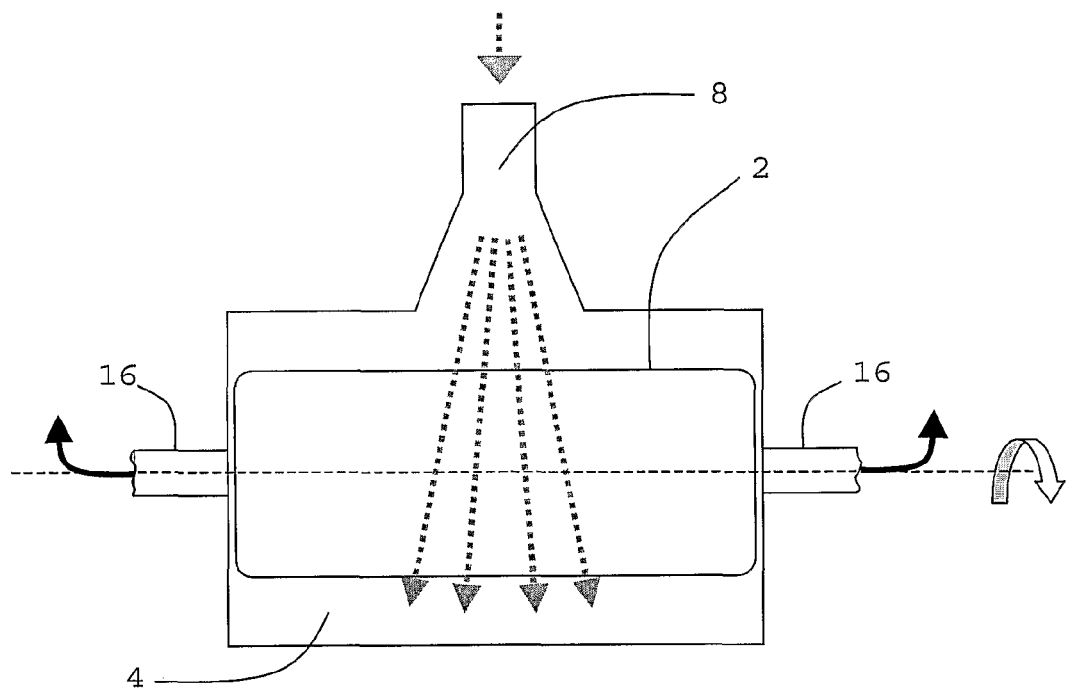
FIG. 2a shows a schematic top view of the tangential separator of FIG. 1.
Figure 2B:
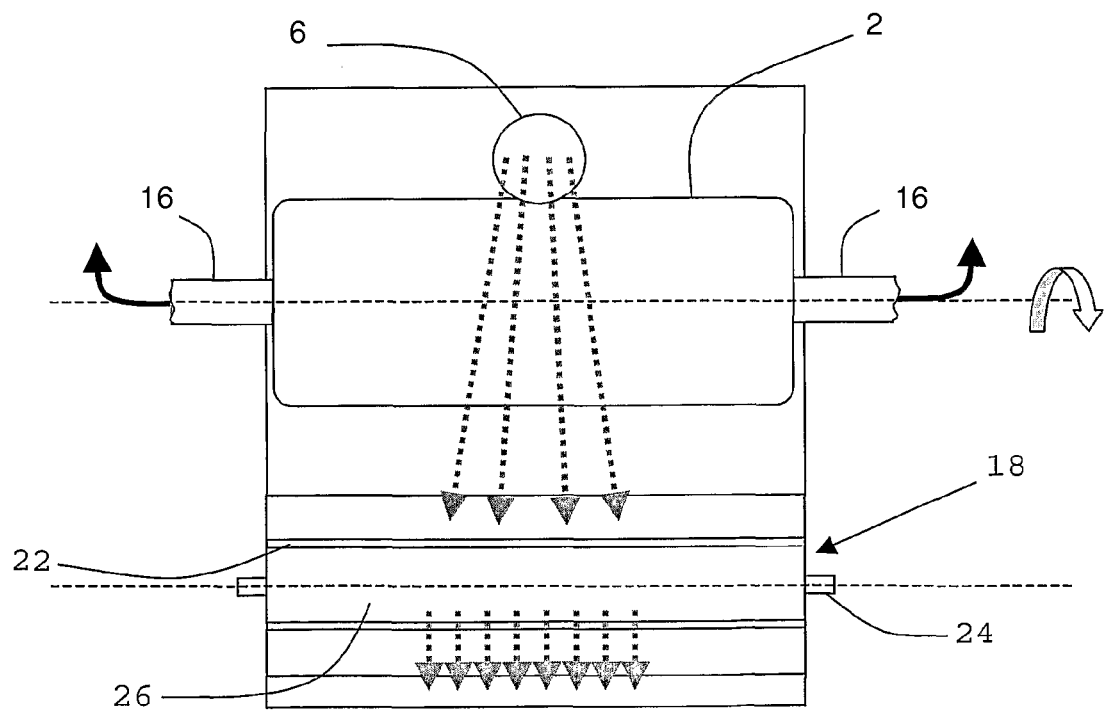
FIG. 2b shows a schematic front view of the tangential separator of FIG. 1.

Having passed over the sieve drum 2, the separated cut tobacco filler slides under gravity down the outer wall of the chamber 4 against which it is projected and collects in the uppermost of the four chambers 26 of the rotary airlock 18. As shown in FIG. 2a, the stream of pneumatically transported cut filler (indicated by the dotted arrows in FIG. 2a) passing from the duct 6 into the chamber 4 through the inlet 8 diverges slightly as it passes over the sieve drum 2. Nevertheless, as shown in FIG. 2b, the separated tobacco projected onto the outer wall of the chamber 4 is heavily concentrated in the centre thereof. This uneven distribution of the separated tobacco across the outer wall is retained as the tobacco falls under gravity into the rotary airlock 18 and gives rise to a corresponding uneven distribution of tobacco across the chamber 26 of the rotary airlock 18, as shown in FIG. 2b.

The central shaft 24 of the rotary airlock 18 is rotated about its longitudinal axis in the opposite direction to the sieve drum 2 (as indicated by the arrow in FIG. 1) by means of, for example, a belt. As the central shaft 24 rotates, the chamber 26 in which the tobacco has collected circulates within the cylindrical housing 20 in the same direction and, when the shaft 24 has rotated by 180°, the collected tobacco falls from the chamber 26 through the base of the cylindrical housing 20 into the hopper. At the same time, further separated cut tobacco filler that has passed over the sieve drum 2 is collected in other chambers 26 on the rotary airlock 18 as they circulate within the cylindrical housing 20.

Figure 3:
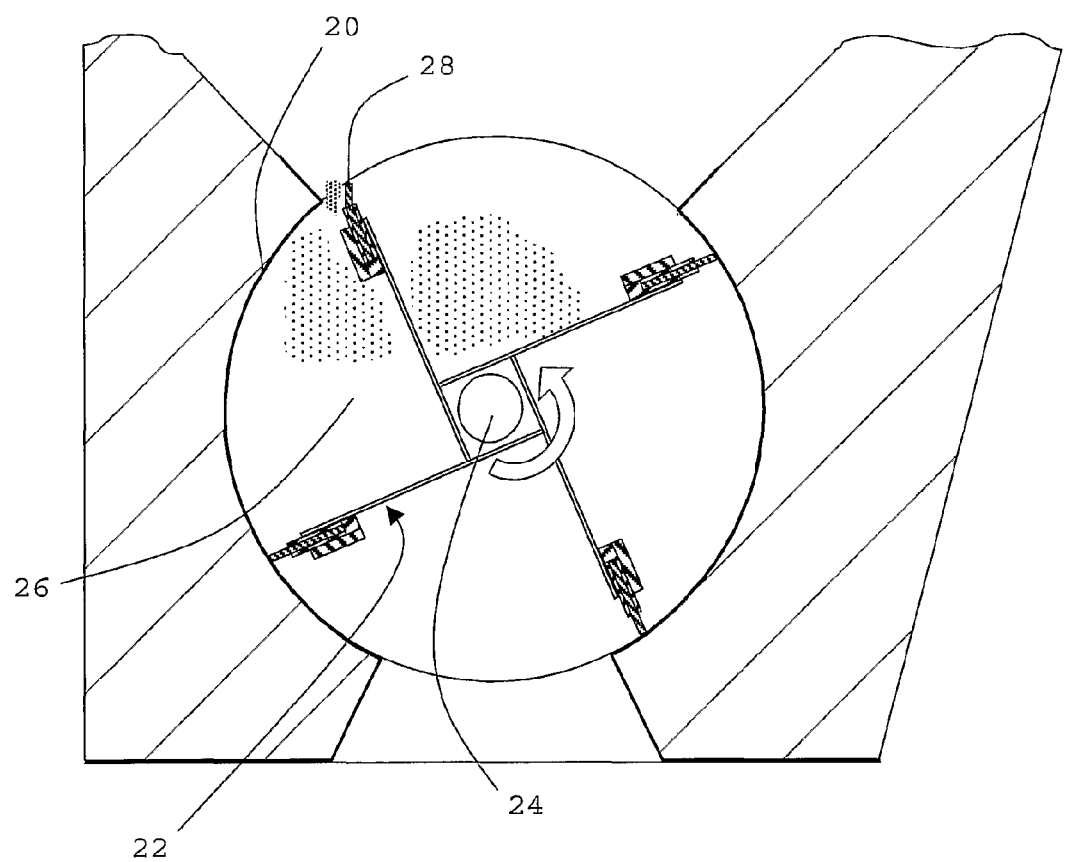
FIG. 3 shows an enlarged cross-section of the rotary airlock of the tangential separator of FIG. 1 in use.

As the rotary airlock 18 rotates, the outer edges of the outer peripheral seals 28 of the vanes 22 defining the chamber 26 are swept along the internal surface of the cylindrical housing 20. In use, as the rotary airlock 18 rotates, lumps of tobacco present in the cut tobacco filler or excess tobacco accumulated in the chamber 26 can become lodged between the cylindrical housing 20 and the outer peripheral seal 28 of one of the vanes 22 defining the chamber 26. As shown in FIG. 3, when this happens the additional force exerted on the outer edge of the outer peripheral seal 28 by the lodged tobacco (illustrated by a dotted region in FIG. 3) causes the edge of the outer peripheral seal 28 to bend permanently in the opposite direction to the direction of rotation of the rotary airlock 18. Even after the lodged tobacco is released, the outer edge of the seal 28 remains deformed resulting in a permanently increased gap between the outer edge of the seal 28 and the inner surface of the cylindrical housing 20 in the region of the deformation. Increased gaps between the seals 28 and the internal surface cylindrical housing 20 produced in this way reduce the air-tightness of the airlock and hence the efficiency of the cigarette making apparatus. With continuous usage the peripheral seals of the radial vanes of the rotary airlocks of known tangential separators can soon become so deformed that drops in efficiency of between about 50% to more than 100% are experienced, necessitating cessation of cigarette production and replacement of the seals. For the sake of simplicity, the outer peripheral seals 28 of the three is other vanes 22 in FIG. 3 are shown to be straight. It will be appreciated, however, that, in use, the outer edges of the outer peripheral seals 28 of these three vanes 22 will actually bend slightly, in the opposite direction to the direction of rotation of the rotary airlock 18, as they are swept along the inner surface of the cylindrical housing 20.

In an attempt to spread the separated tobacco across the tangential separator and so overcome the problem of uneven delivery of tobacco to the chambers 26 of the rotary airlock 18, an inverted V-shaped deflector (not shown) is commonly mounted on the outer wall on which the stream of cut filler is projected. While such deflectors may ameliorate the problem of uneven distribution to a degree, even when they are present the tobacco passing over the sieve drum to the rotary airlock is still largely concentrated in a central column as shown in FIG. 2b.

Tangential separators used in the manufacture of cigarettes commonly have a width of about 600 mm. However, tangential separators having widths of up to 1500 mm are also employed. It will be appreciated that in these wider tangential separators, where the disparity between the diameter of the duct 8 and inlet 10, typically between about 110 mm and about 120 mm, and the width of the chamber 4 is greater, the problem of uneven distribution of tobacco across the rotary airlock is more pronounced.

The tangential separator according to the present invention shown in FIGS. 4a, 4b, 5a and 5b has the same general structure as the known tangential separator shown in FIG. 1;

the same reference numerals are used in FIGS. 4a, 4b, 5a and 5b to identify parts of the tangential separator according to the invention corresponding to those of the known tangential separator already described.

Figure 4A:
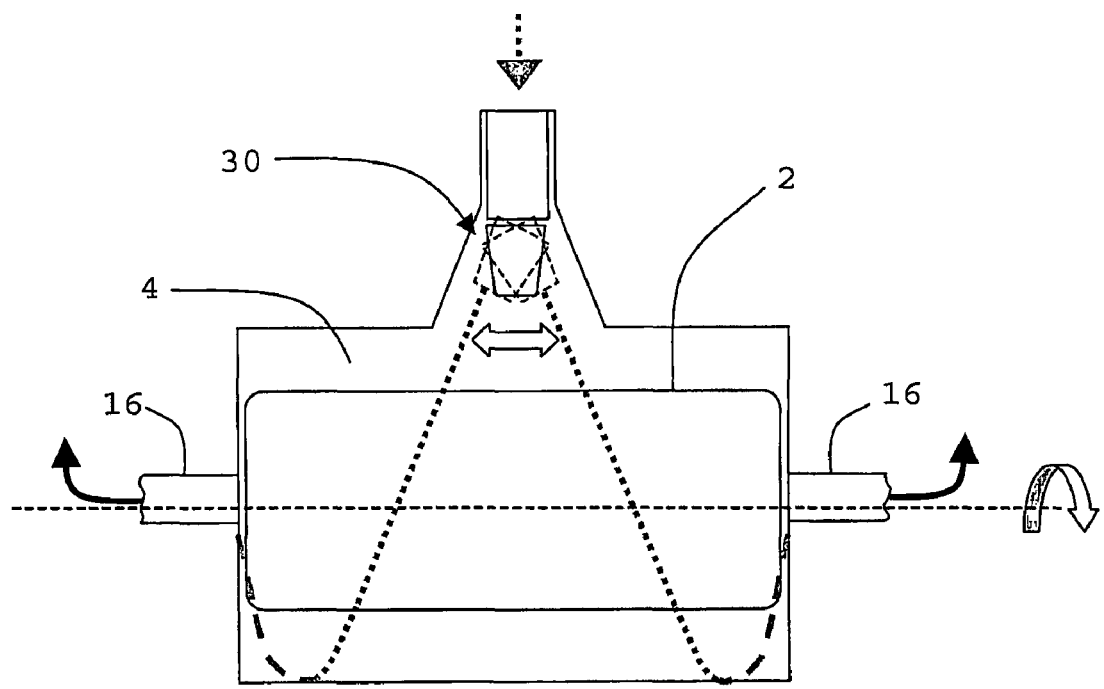
FIG. 4a shows a schematic top view of a tangential separator according to the present invention.
Figure 4B:
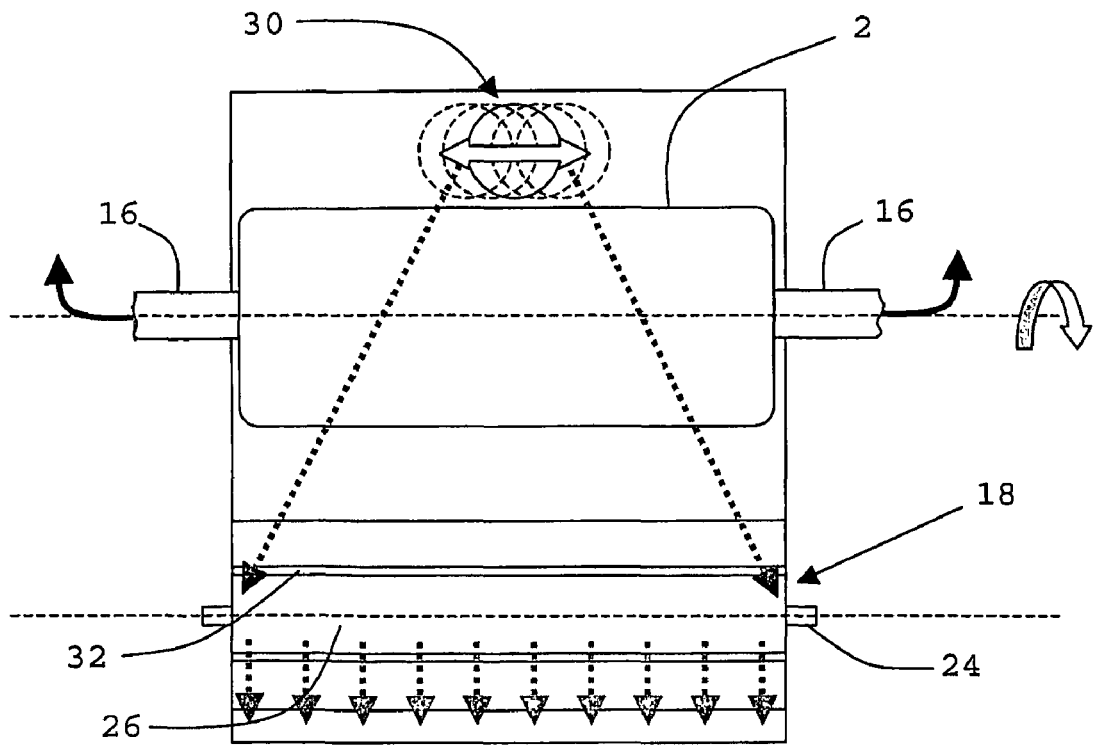

The structure of the tangential separator according to the invention shown differs from that of the known tangential separator shown in FIG. 1 in the following respects. Firstly, as shown in FIGS. 4a and 4b, instead of the fixed inlet 8 of the known separator, the tangential separator according to the invention comprises a moveable inlet 30 mounted on the side of the chamber 4 and connected to the duct 6, through which pneumatically transported tobacco from the duct 6 is fed into the chamber 4. The inlet 30 is coupled via a crank to an eccentric wheel powered by an electric motor mounted on top of the tangential separator, for horizontal movement relative to the duct 6.

Figure 5B:
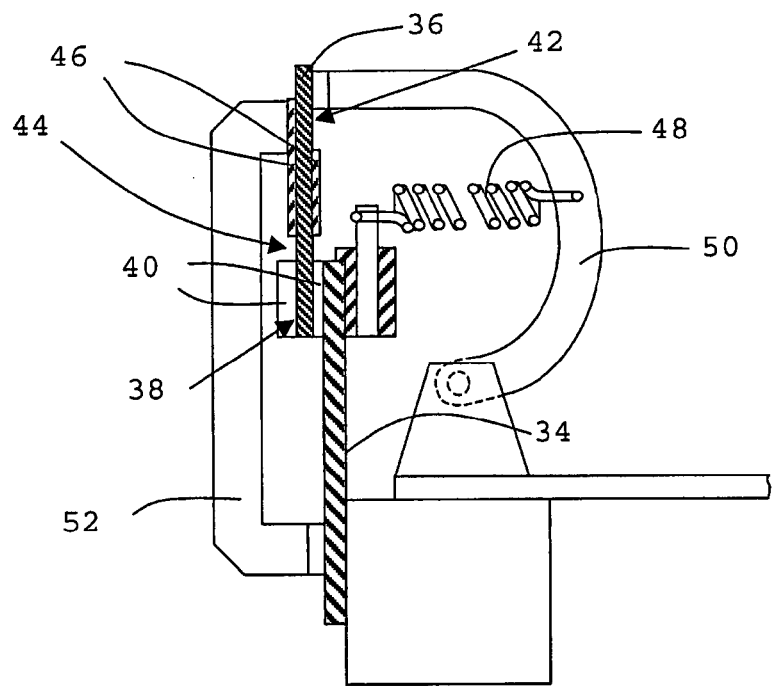
FIG. 5b shows a cross-section of the rotary airlock of the tangential separator of FIGS. 4a and 4b in use.

Secondly, as shown in FIG. 5b, instead of the four radial vanes 22 of the known separator, the rotary airlock 18 of the tangential separator according to the invention shown comprises four radial vanes 32 each of which comprises a first metal plate 34 fixedly mounted on the central shaft 24 and an outer peripheral flexible plastic seal 36. The radially inner end 38 of the flexible seal 36 is held rigidly between a second pair of metal plates 40 which are attached to one side of the radially outer end of the first metal plate 34. A radially outer portion 42 of the seal 36, spaced from the radially inner end of the seal 36 by a intermediate portion of the seal 44 is connected to and held rigidly between a third pair of metal plates 46. The third pair of metal plates and radially outer portion 42 of the seal 36 are biased in position by a helical spring 48, which acts to resist movement of the third pair of metal plates and radially outer portion 42 of the seal 36 towards the spring 48. The helical spring is mounted between the side of the radially outer end of the first metal plate 34 distant from the second pair of metal plates 40 and the inside of a first curved arm 50 pivotally mounted at its radially inner end about an axis parallel to the longitudinal axis of the rotary airlock and having a radially outer end which abuts the radially outer portion 42 of the seal 36. A second curved arm 52 is fixedly mounted at its radially inner end on the side of the radially inner end of the first metal plate 34 distant to the first curved arm 50. The radially outer end of the second curved arm 52 rests against the outside of the third metal plate 46 distant from the first curved arm 50.

The other structural features of the tangential separator is according to the invention are the same as those of the known separator shown in FIGS. 1, 2a and 2b and described above.

In use, power is supplied to the electric motor coupled to the inlet 30 as a stream of pneumatically transported cut tobacco filler is fed from the storage feeder duct through the duct 6 and inlet 30 into the tangential separator. As shown in FIG. 4a, rotation of the wheel of the motor causes the inlet 30 to oscillate from side-to-side so that the stream of cut filler (indicated by the dotted arrow in FIG. 4a) entering the tangential separator is swept across the chamber 4 as it passes over the sieve drum 2. For a chamber 4 of a given width, the length and cross-section of the inlet 30 and the diameter of the wheel are chosen such that the amplitude of the oscillation of the inlet 30 is sufficient to sweep the stream across the full width of the chamber 4. As the pneumatically transported cut filler passes over the sieve drum, the conveying air is removed from it and exhausted through the sieve drum by suction in the manner described above in respect of the known tangential separator shown in FIG. 1. Due to the oscillation of the inlet 30 and sweeping of the stream of cut filler over the length of the sieve drum 2 (width of the of the chamber 4), the separated tobacco that is projected onto the outer wall of the chamber 4 is not concentrated in the centre thereof as shown in FIG. 2b, but rather is more evenly distributed across the width of the outer wall. The improved distribution of the separated tobacco across the outer wall is retained as the tobacco falls under gravity into the rotary airlock 18 and gives rise to a corresponding improved distribution of tobacco across the chamber 26 of the rotary airlock 18, as shown in FIG. 4b.

The separated tobacco falling from the outer wall is collected in the chambers 26 of the rotary airlock 18 of the tangential separator according to the invention and subsequently deposited from the chambers 26 into a hopper that feeds the tobacco rod maker in the general manner described above in respect of the known tangential separator shown in FIG. 1.

Figure 5A:
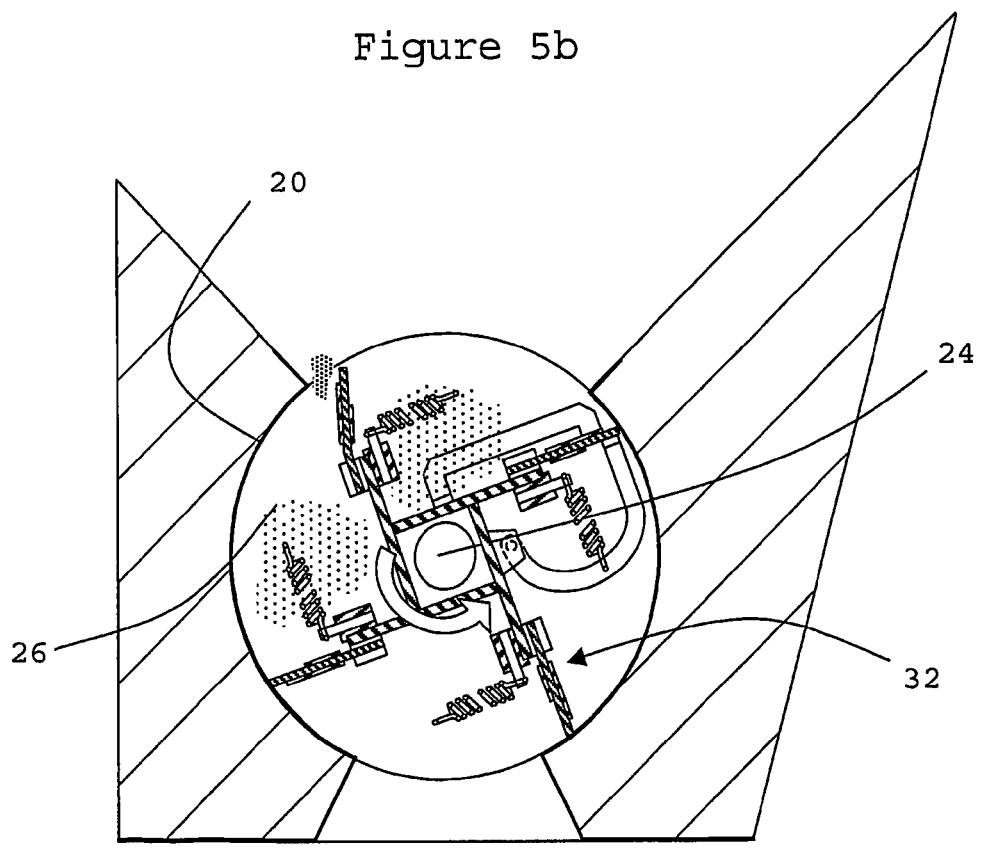
FIG. 5a shows a side view of a vane of the rotary airlock of the tangential separator of FIGS. 4a and 4b.

With reference to FIG. 5a, if during rotation of the rotary airlock 18 a lump of tobacco present in the cut tobacco filler or excess tobacco accumulated in the chambers 26 becomes lodged between the cylindrical housing 20 and the outer edge of the seal 36 of one of the vanes 32, the seal 36 temporarily deflects until the lodged tobacco is freed. As the airlock rotates, the force exerted on the outer edge of the seal 36 by the lodged tobacco causes the radially outer portion 42 of the seal 36 which is held rigidly between the third pair of plates 46 to be bent about the intermediate portion of the seal 44, which acts as a hinge, in the opposite direction to the direction of rotation of the airlock, against the action of the helical spring 48. As the radially outer portion 42 of the seal 36 bends, the first curved arm 50 is forced to pivot about its radially inner end in the opposite direction to the direction of rotation of the airlock, thereby stretching the helical spring 48. For clarity, the first curved arm 50 and second curved arm 52 have only been shown for one of the vanes 32 shown in FIG. 5a. It will be appreciated, however, that the construction of all four vanes 32 of the rotary airlock 18 shown in FIG. 5a is identical.

Once the lodged tobacco is freed and the force exerted on the outer edge of the seal 36 removed, the helical spring 48 contracts forcing the first curved arm 50 to pivot about its radially inner end in the direction of rotation of the airlock back to its original position, thereby driving the radially outer portion 42 of the seal 36 and the third pair of plates 46 back to their original radial positions. The second curved arm 52 prevents the first curved arm 50, the radially outer portion 42 of the seal 36 and the third pair of plates 46 from moving beyond their original radial positions in the direction of rotation of the airlock.

For the sake of simplicity, the outer peripheral flexible plastic seals 36 of the three other vanes 32 in FIG. 5a are shown to be straight. It will be appreciated, however, that, in use, the outer edges of the outer peripheral seals 36 of these three vanes 32 may bend slightly, in the opposite is direction to the direction of rotation of the rotary airlock 18, as they are swept along the inner surface of the cylindrical housing 20.

The speed of rotation of the wheel of the electric motor coupled to the inlet 30, and hence the speed of oscillation of the inlet, is chosen such that the stream of pneumatically transported tobacco is swept fully across the width of the chamber 4 and the length of the sieve drum 2 within the time in which tobacco collects in each of the four chambers 26 of the rotary airlock 18. For the tangential separator shown in FIGS. 4a, 4b and 5, having a rotary airlock 18 with four vanes 32 defining four chambers 26, the frequency of oscillation of the inlet 30 is at least four times the frequency of rotation of the rotary airlock 18. In general, to ensure optimum distribution of tobacco across the rotary airlock, the speed at which the inlet is moved should be such that:

$$\text{Frequency}(S) \geq \text{Frequency}(R) \times N$$

where frequency(S) is the frequency of sweep of the pneumatically transported particulate material over the separation surface, frequency(R) is the frequency of rotation of the rotary airlock and N is the number of vanes/chambers of the rotary airlock. It will be appreciated that while the tangential separator shown in FIGS. 4a, 4b, 5a and 5b comprises a rotary airlock having four vanes, tangential separators according to the invention may include rotary airlocks having different numbers of vanes. Preferably, however, the number of vanes is greater than or equal to four.

Advantageously, the motion of the inlet and rotation of the rotary airlock may be synchronised by means known in the art to ensure that an optimum relative speed is maintained.

The invention claimed is:

1. A separator for pneumatically transported particulate material comprising:
   a separation surface through which, in use, a vacuum is drawn, for separating the particulate material from a gaseous medium in which it is transported;
   an inlet for feeding a stream of the pneumatically transported particulate material to the separation surface; and
   a mechanism comprising an eccentric wheel powered by a moror, which oscillates the inlet from side-to-side to sweep the particulate material over a length of the separation surface.

2. A separator according to claim 1 wherein the inlet oscillates from side-to-side to sweep the particulate material substantially evenly over the length of the separation surface.

3. A separator according to claim 1 wherein the separation surface is a cylindrical sieve drum mounted for rotation about its longitudinal axis.

4. A separator according to claim 3 wherein the inlet oscillates from side-to-side to sweep the particulate material over the circumferential surface of the sieve drum.

5. A separator according to claim 1 wherein the particulate material travels through apparatus downstream of the separator and the inlet oscillates from side-to-side to sweep the particulate material in the direction substantially perpendicular to the direction of travel of the particulate material.

6. A separator according to claim 1 for pneumatically transported tobacco.

7. A cigarette-making machine comprising a separator according to claim 1.

8. A cigarette-making machine according to claim 7 further comprising a rotary airlock for pneumatically transported particulate material, the rotary airlock comprising a plurality of radial vanes mounted for rotation about a central axis, characterized in that each of the vanes is resiliently biased in a first radial position whereby, in use, when a force acts upon the vane in a direction contrary to the direction of rotation of the airlock, the vane is deflected from the first radial position in the direction of the force and when the force is removed the vane returns to the first radial position.

9. A cigarette-making machine according to claim 8 wherein the deflection of the vane is proportional to the magnitude of the force acting upon it.

10. A cigarette-making machine according to claim 8 wherein each of the vanes is resiliently biased in a first radial position by a spring.

11. A separator according to claim 1 further comprising a duct, which feeds the pneumatically transported tobacco from a storage feeder to the inlet.

12. A separator according to claim 1 wherein the inlet is coupled via a crank to an eccentric wheel powered by an electric motor.

13. A separator according to claim 12 wherein rotation of the wheel of the motor causes the inlet to oscillate from side-to-side.

14. A separator according to claim 12 wherein a speed of rotation of the wheel of the electric motor coupled to the inlet, and a speed of oscillation of the inlet, is chosen such that a stream of pneumatically transported tobacco is swept fully across the length of the separation surface.

15. A separator according to claim 1 wherein the inlet oscillates side-to-side in a horizontal movement.

16. A separator according to claim 1 further comprising a rotary airlock having at least four chambers, and wherein a frequency of oscillation of the inlet is at least four times a frequency of rotation of the rotary airlock.

* * * * *